(12) United States Patent
Aurongzeb et al.

(10) Patent No.: US 8,664,865 B2
(45) Date of Patent: Mar. 4, 2014

(54) LIGHTING SYSTEM HAVING AN OLED LIGHT SENSOR

(75) Inventors: Deeder Mohammad Aurongzeb, Mayfield Heights, OH (US); Bruce Richard Roberts, Mentor on the Lake, OH (US)

(73) Assignee: General Electric Company, Schenectady, NY (US)

(*) Notice: Subject to any disclaimer, the term of this patent is extended or adjusted under 35 U.S.C. 154(b) by 144 days.

(21) Appl. No.: 13/431,639

(22) Filed: Mar. 27, 2012

(65) Prior Publication Data
US 2013/0257288 A1    Oct. 3, 2013

(51) Int. Cl.
*H05B 37/02* (2006.01)
(52) U.S. Cl.
USPC ............................ 315/152; 315/294; 315/307
(58) Field of Classification Search
USPC .................................. 315/152, 291, 294, 307
See application file for complete search history.

(56) References Cited

U.S. PATENT DOCUMENTS

| 8,358,071 B2 * | 1/2013 | Verjans et al. ................. 315/32 |
| 2005/0036294 A1 | 2/2005 | McMahon |
| 2011/0304592 A1 | 12/2011 | Booth, Jr. et al. |
| 2012/0006978 A1 * | 1/2012 | Ludwig ...................... 250/214.1 |
| 2013/0175919 A1 * | 7/2013 | Van Bommel et al. ....... 313/504 |
| 2013/0221856 A1 * | 8/2013 | Soto .............................. 315/152 |

FOREIGN PATENT DOCUMENTS

| EP | 1701589 A1 | 9/2006 |
| WO | 9940559 A2 | 8/1999 |
| WO | 03054980 A2 | 7/2003 |
| WO | 2008152922 A1 | 12/2008 |
| WO | 2010089596 A2 | 8/2010 |

OTHER PUBLICATIONS

Search Report and Written Opinion from corresponding PCT Application No. PCT/US2013/028522 dated May 3, 2013.

* cited by examiner

*Primary Examiner* — Don Le
(74) *Attorney, Agent, or Firm* — Peter T. DiMauro; Global Patent Operation

(57) ABSTRACT

An apparatus and method of detecting ambient light in a lighting system is provided. An OLED may be used to emit light and detect ambient light in such a system. Detection can occur during a time interval when light is not emitted from the OLED. Feedback to control the emitted light level of the OLED can be based on the detected ambient light.

17 Claims, 6 Drawing Sheets

LIGHTING SYSTEM HAVING AN OLED LIGHT SENSOR

FIELD OF THE INVENTION

The present disclosure relates to a light emitting system and more particularly to an organic light emitting device and method capable of emitting light and sensing ambient light using the same device.

BACKGROUND OF THE INVENTION

An organic light emitting device (OLED) includes an anode, a cathode, and an organic light emitting layer. Additional layers such as moisture absorption layers or insulating layers may also be included in an OLED. In order to produce light emissions from an OLED, a voltage is applied across the anode and cathode via a voltage source. Electrons are directly injected into the organic light emitting layer from the cathode and holes are directly injected into the organic light emitting layer from the anode. The electrons and holes travel through the light emitting layer and recombine to form excited molecules. The excited molecules emit radiation (i.e. visible light or UV radiation) as they decay.

OLEDs have been implemented in various technologies such as television screens, computer monitors, mobile phones, PDAs, and watches. However, several factors have hindered the widespread use of OLEDs as a direct replacement for lighting options in household and commercial businesses such as material availability, product lifetime, and color balance.

Conventionally, lighting systems can incorporate the use of a light level detector such as a photocell. However, this configuration requires that the photocell be positioned a distance away from the lamps used in the lighting system because a photocell is unable to differentiate between the light emitted from the lighting system and ambient light. In addition, in order to implement this conventional configuration, an additional component (the photocell) adds complexity and cost to the lighting system.

BRIEF DESCRIPTION OF THE INVENTION

Aspects and advantages of the invention will be set forth in part in the following description, or may be obvious from the description, or may be learned through practice of the invention.

To address one or more of the above shortcomings, embodiments of the invention provide a system and/or method that can dynamically monitor and detect a change in ambient light using an organic light emitting device (OLED). In contrast to prior systems and methods, embodiments of the invention are configured to detect a voltage output to determine an ambient light level. Additionally, the detected voltage output can be used to modify the emission and/or luminescence level for the OLED.

Embodiments of the present disclosure provide an apparatus and/or method of detecting ambient light in a lighting system. An OLED may be used to emit light and detect ambient light in such a system. Detection can occur during a time interval when light is not emitted from the OLED. Feedback to control the emitted light level of the OLED can be based on the detected ambient light.

One exemplary aspect of the present disclosure is directed to an organic light emitting system. The organic light emitting system can include an organic light emitting device (OLED) having an anode, a cathode, and an organic light emitting layer disposed between the anode and cathode. The OLED can be configured to provide an output voltage signal associated with ambient light impinging on a surface of the OLED. The organic light emitting system can also include a control system coupled to the OLED. The control system can be configured to receive the output voltage signal from the OLED and to control emission of light from the OLED based on the output voltage signal received from the OLED.

Another exemplary aspect of the present disclosure is directed to a method of controlling emission of an organic light emitting device (OLED) where the OLED includes an anode, a cathode, and an organic light emitting layer disposed between the anode and cathode. The method can include operating the OLED in a first mode such that the OLED is configured to provide a voltage output signal indicative of ambient light impinging on a surface of the OLED. The method further includes receiving the voltage output signal at a controller; operating the OLED in a second mode such that the OLED is configured to emit light; and adjusting the emission of light by the OLED based on the voltage output signal.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

Reference is now made briefly to the accompanying drawings, in which.

DETAILED DESCRIPTION OF THE INVENTION

Figure 1:
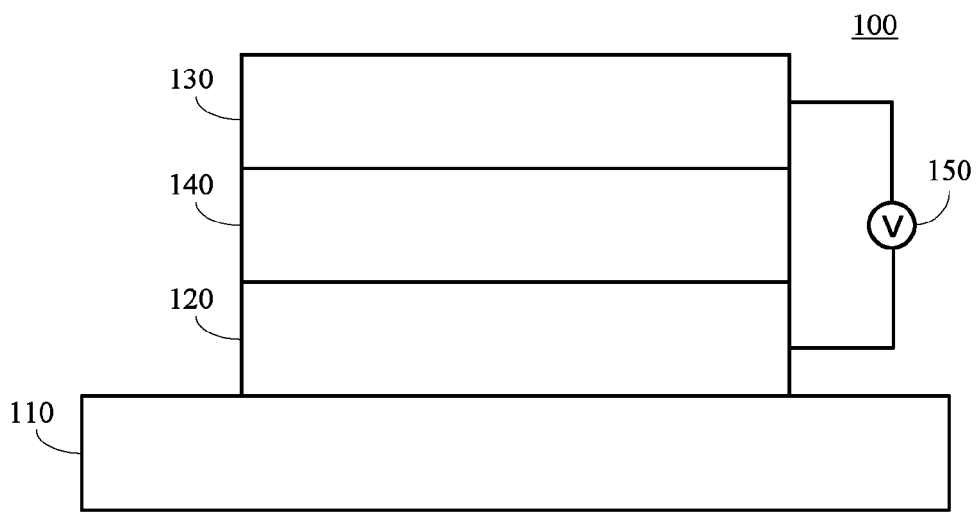
FIG. 1 provides a schematic representation of a side, cross-sectional view of an exemplary OLED according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that embodiments of the present invention cover such modifications and variations as come within the scope of the appended claims and their equivalents.

FIG. 1 illustrates a cross-section of a planar-type organic light emitting device (OLED) 100 according to an embodiment of the present disclosure. The OLED 100 includes a substrate 110, cathode 120, light emitting layer 140 and anode 130. Substrate 110 can be a flat sheet that is light transmissive or it can be opaque, not permitting any light to transmit through the material or reflect therefrom. In addition, while cathode 120 and anode 130 are arranged as illustrated, the electrodes may be reversed and anode 130 may be adjacent to substrate 110.

A voltage may be applied across cathode 120 and anode 130 via voltage source 150. OLED 100 emits radiation by electron-hole recombination due to direct electron and hole injection into the light emitting layer 140. While not illustrated, additional layers for moisture absorption, insulating layers and/or any other material to enhance light emitting efficiency may be included.

Figure 2:
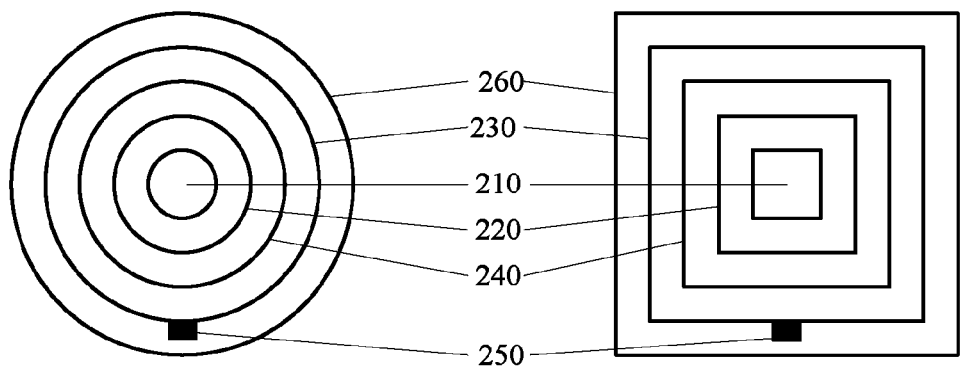
FIG. 2 provides a schematic representation of a side, cross-sectional view of exemplary OLEDs according to an exemplary embodiment of the present disclosure.

FIG. 2 illustrates a cross-section of non-planar-type (flexible) OLEDs 200. While two alternatives are shown, any non-planar shape may be used. Flexible OLED 200 can include a flexible core 210 having a cathode 220, organic light emitting layer 240 and anode 230 that surround the core 210. Cathode 220 and anode 230 may be interchanged. Core 210 can have any non-planar shape and the remaining layers may each surround the adjacent layer according to the non-planar shape. Alternatively, core 210 may be omitted and the inner core may include the cathode 220 in a non-planar shape.

Protective layer 260 can be a radiation transmissive moisture layer, an air barrier layer, an encapsulation layer and/or a protective layer. Protective layer 260 may be a single layer or a plurality of layers.

Cathode 220 and anode 230 are electrically connected via a voltage source (not shown). Due to the shape of the flexible OLED 200, a drop in voltage may occur along the length of the OLED 200. Therefore, metal contact element 250 is coupled with the anode 230 to prevent a significant drop in voltage.

Anodes 130 and 230 can be manufactured from a radiation transmissive material such as e.g., indium tin oxide. Cathodes 120 and 220 can be manufactured from a material having a low work function value such that a relatively small voltage causes emission of electrons from the cathode. For example, cathodes 120 and 220 may include calcium, or a metal such as gold, indium, manganese, tin, lead, aluminum, silver, magnesium, or a magnesium/silver alloy.

Figure 3:
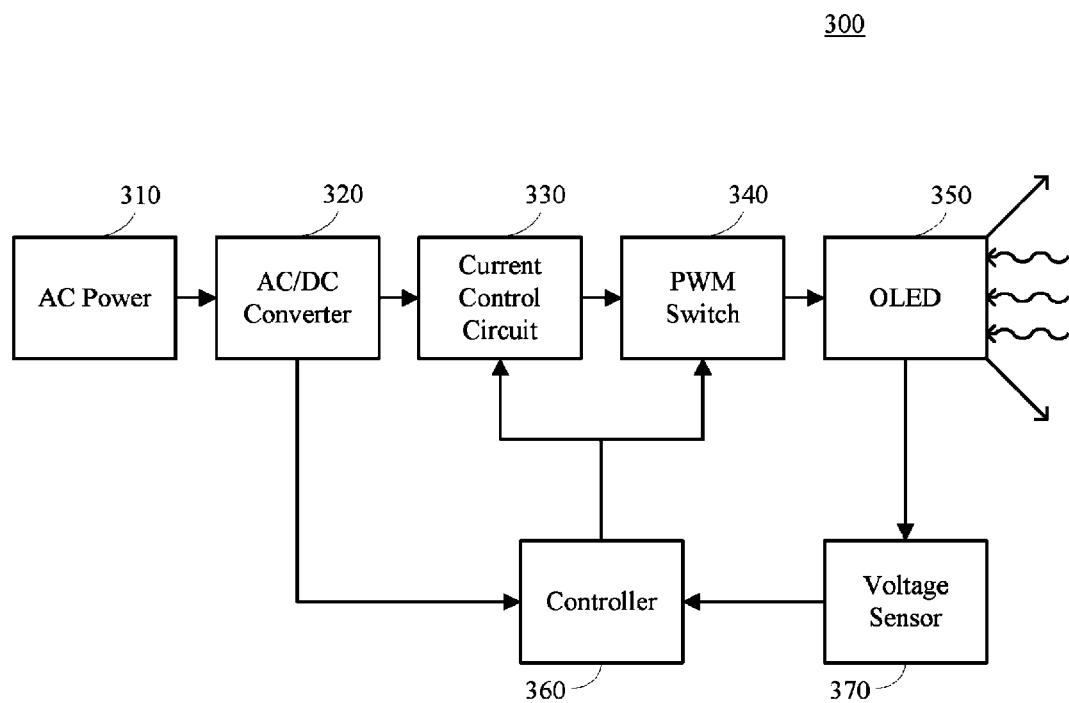
FIG. 3 provides a block diagram of a lighting system according to an exemplary embodiment of the disclosure.

Referring to FIG. 3, there is illustrated a schematic block diagram of an exemplary embodiment of light emitting system 300. System 300 can include an alternating current (AC) power supply 310 that supplies power to the system. AC power supply 310 is coupled to an AC/DC converter 320. The AC/DC converter 320 can be configured to provide power to the OLED through use of current control circuit 330 and pulse width modulation switching devices 340. The AC/DC converter 320 can also provide power to the controller 360.

Controller 360 can be any type of controller such as a micro-controller. In addition, controller 360 may include a memory and microprocessor, CPU or the like, such as a general or special purpose microprocessor operable to execute programming instructions or micro-control code associated with light system control. The memory may represent random access memory such as DRAM, or read-only memory such as ROM or FLASH. In one embodiment, the processor executes programming instructions stored in memory. The memory may be a separate component from the processor or may be included onboard within the processor.

Controller 360 can be coupled with the current control circuit 330 and pulse width modulation (PWM) switch 340. Current control circuit 330 can be used to control the current provided to the OLED 350. The PWM switch 340 can be used to switch the OLED from a deactivated state (first mode of operation) where the OLED is configured to detect ambient light and an activated state (second mode of operation) where the OLED is configured to emit light. A current control signal can be provided to the PWM switch 340, which creates a signal having a duty cycle. The duty cycle of the input signal to the OLED 350 may correlate with the activation or deactivation of OLED 350. The human eye cannot detect minute interruptions in activation if the deactivation period is short enough, such as a millisecond. Thus, if a duty cycle is selected to modify the timing period, the OLED can be activated for a portion of the timing period and deactivated for a portion of the timing period without noticeable interruption to a user. Alternatively, the duty cycle may correlate to the level of luminescence during activation. In other words, the duty cycle can correlate to the amount of light emitted from the OLED. For example, if the duty cycle is 50%, the OLED can be set at a luminescence level equal to 50% of the total luminescence of the OLED.

OLED 350 emits light at various luminescence levels during activations periods and does not emit light during deactivation periods. During a selected deactivation period, the OLED 350 may detect ambient light. Ambient light can be detected by the voltage that is induced across OLED 350 when light impinges on the surface of the OLED 350. After a voltage is induced across the OLED 350, voltage sensor 370 detects the induced voltage and sends a feedback signal to controller 360. Controller 360 can then decide how to control the activation and luminescence level of OLED 350 based on the feedback signal from voltage sensor 370.

Figure 4:
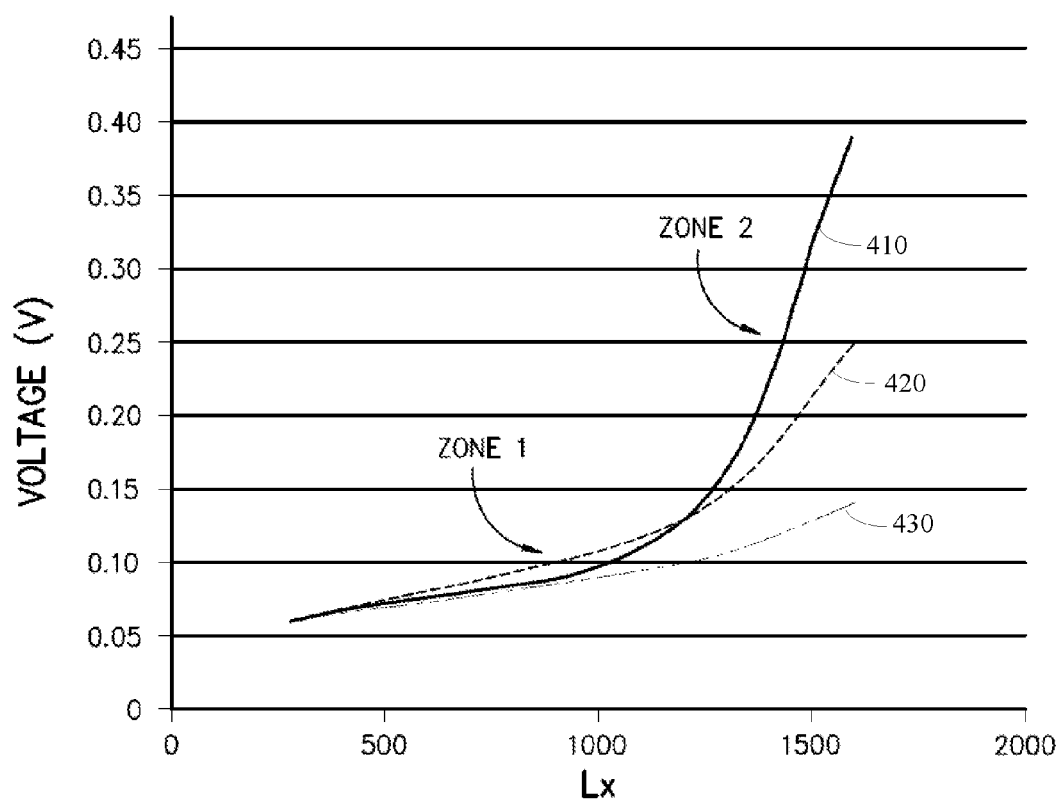
FIG. 4 provides a graphical depiction of voltage levels in relation to ambient light levels in an exemplary embodiment of the present disclosure.

FIG. 4 illustrates a graph of an exemplary embodiment of the present disclosure that represents a correlation between a voltage induced across OLED 350 and an amount of light detected. FIG. 4 is exemplary because it contains theoretical values. It is included here to illustrate how an OLED voltage response to detected ambient light can be tuned based on various factors.

When ambient light impinges on the surface of OLED 350, a voltage can be produced. The amount of voltage induced across the OLED 350 surface may not be enough to power on the OLED 350, however the induced voltage can correlate to a detected luminescence emittance level (lux). Various factors may be used to tune an OLED to produce a voltage at a specific luminescence emittance level, such as material used in the OLED, control circuitry, controller programming, etc. For example, the tuning may create a linear or exponential correlation or it may also create a combination correlation. As illustrated in waveform 410, a first OLED can be tuned based on zones. In zone 1, the correlation can be linear and in zone 2 the correlation can be exponential. In waveform 420, this tuning can be similar to waveform 410 but the exponential portion can be in different proportions. As illustrated in waveform 430, the correlation in both zones can be linear. The different tunings are based on a desired accuracy. For example, if the ambient light levels are more uniform in an environment or if the level of luminescence must be accurate for a subtle ambient light level change, the OLED 350 may be more or less accurately tuned. In addition, while only two zones are illustrated, additional zones may also be included for any tuning level. For example, a third zone may be added to waveform 410, where zone three would take on linear characteristics.

The correlation between the induced voltage and an ambient light level may be compiled and configured into a predetermined table or algorithm within the controller 360 or other device. The table may be broken down into ambient light level ranges or detected induced voltage may correlate one-to-one to a specific light level. In addition, desired luminescence levels can also be predetermined Desired luminescence levels may depend on various factors such as time of day, season of the year, type of activity conducted in the environment, etc. The desired luminescence levels may be preprogramed, input by a user or set by a third party such as utility companies.

Figure 5:
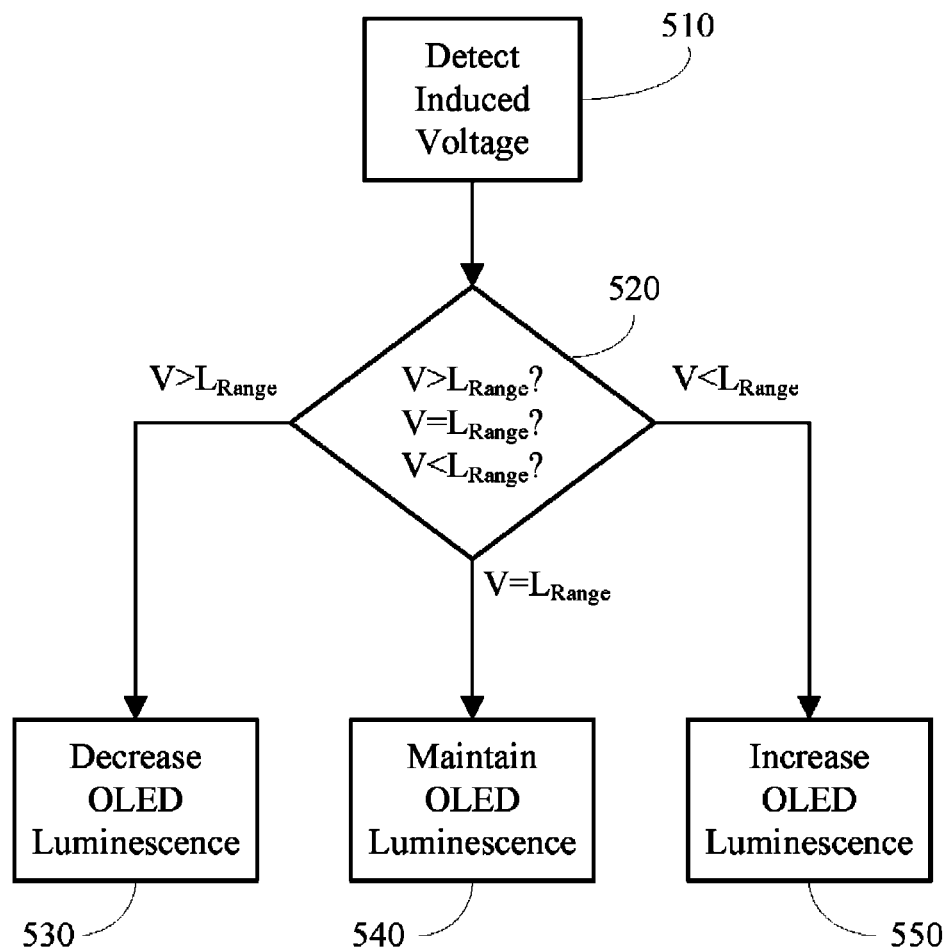
FIG. 5 provides a flow chart of a method for monitoring ambient light according to an exemplary embodiment of the present disclosure.

FIG. 5 illustrates a flow chart of an exemplary method 500 according to an exemplary embodiment of the present disclosure. The method 500 will be discussed with reference to the exemplary organic light emitting system illustrated in FIGS. 3, 6, and 7. However, the method 500 can be implemented with any suitable organic light emitting system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

Beginning at block 510, ambient light impinges on OLED 350 inducing a voltage that is detected by voltage sensor 370. This detected voltage is compared with a predetermined luminescence range or value, as indicated by block 520. When the detected impinging voltage is greater than the current luminescence range or value, the luminescence of the OLED 350 is decreased, as indicated by block 530. When the detected impinging voltage is equal to the current luminescence range or value, the luminescence of the OLED 350 is maintained, as indicated by block 540.

When the detected impinging voltage is less than the current luminescence range or value, the luminescence of the OLED 350 is increased, as indicated by block 550. Turning the OLED on to a predetermined luminescence from a deactivated state or completely off can be included in the steps of increasing the luminescence, block 550, and decreasing the luminescence, as indicated by block 530.

Method 500 can be performed before or after the OLED is activated, however the detection occurs when the OLED is in a deactivated state. For example, the OLED can be activated and then using the PWM switch 340, it can be deactivated for a small period of time, such as a millisecond. Again, since the human eye cannot detect a luminescence change in such a short period of time, a user does not notice that the OLED is deactivated. Thus, while the OLED is in the deactivated state, the detection occurs and OLED is then activated again without interruption of luminescence observed by a user.

Figure 6:
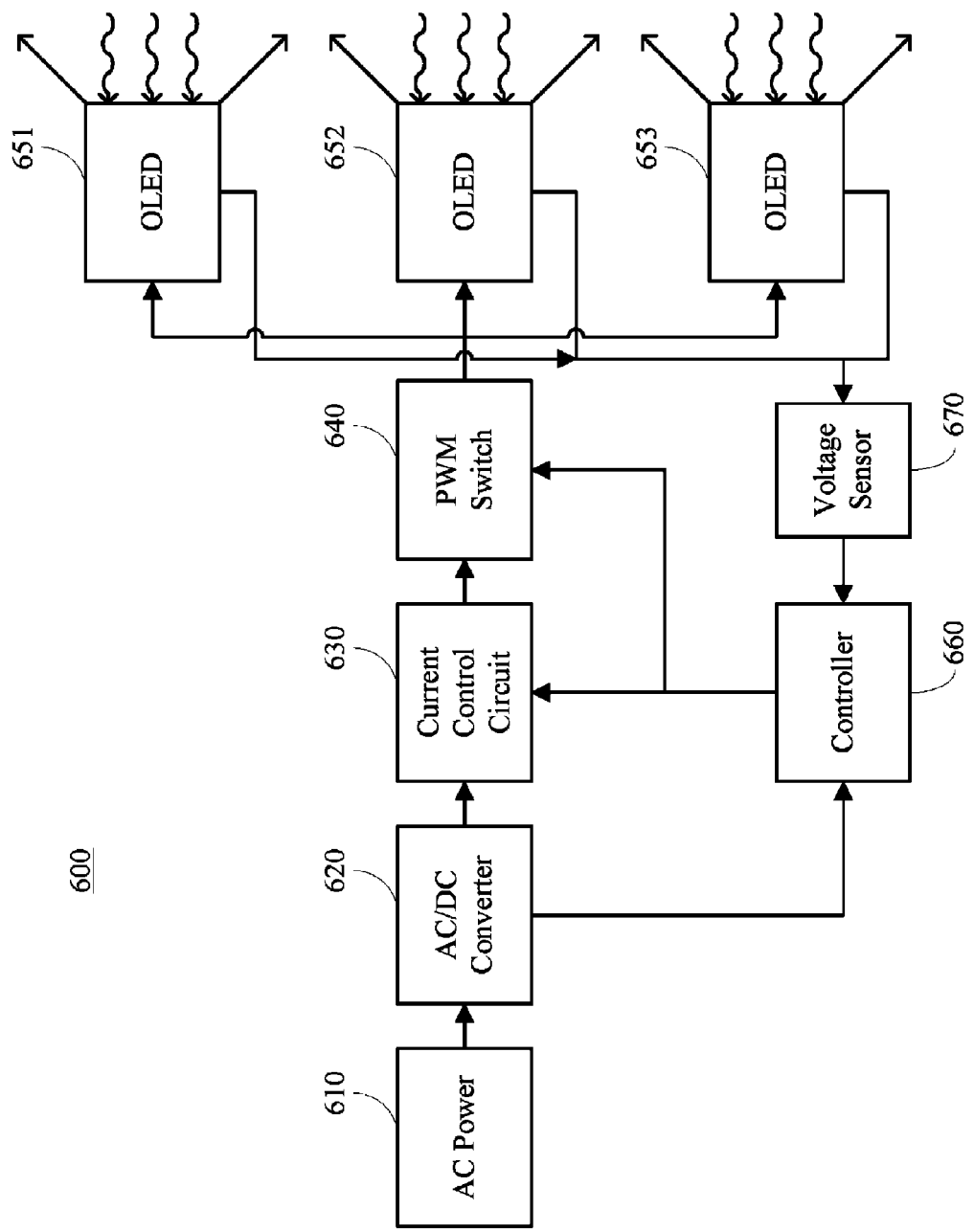
FIG. 6 provides a block diagram of a lighting system according to an exemplary embodiment of the disclosure.

Referring to FIG. 6, an alternative exemplary embodiment of the present disclosed lighting system 600 is illustrated. System 600 includes an AC power supply 610, an AC/DC converter 620, current control circuit 630, PWM switch 640 and controller 660.

System 600 also includes a plurality of OLEDs 651, 652 and 653. OLEDs 651, 652 and 653 can be planar or flexible OLEDs. When flexible OLEDs are used, light may be detected from all directions surrounding the OLED. OLED 651, 652 and 653 can be coupled with voltage sensor 670 and function as an ambient light detector. Alternatively, each OLED 651, 652 and 653 may be coupled to a separate voltage detector corresponding to each device and the output of the plurality of voltage detectors may be input to controller 660. The plurality of detected induced voltages can be averaged together, evaluated on the whole and the OLEDs can be controlled together or the detected induced voltages can be evaluated individually and each OLED controlled individually.

The OLEDs 651, 652 and 653 can detect ambient light in a deactivated state in various ways such as concurrently, sequentially or alternatively. OLEDs 651, 652 and 653 may be positioned in a single space or in various spaces where the ambient light may be different at each location. Induced voltage detection can be performed at various time intervals and depend on various factors such as time of day, season of the year, type of activity conducted in the environment, etc. Alternatively, induced voltage detection can be performed according to a user input or a third party input, such as a utility company.

Figure 7:
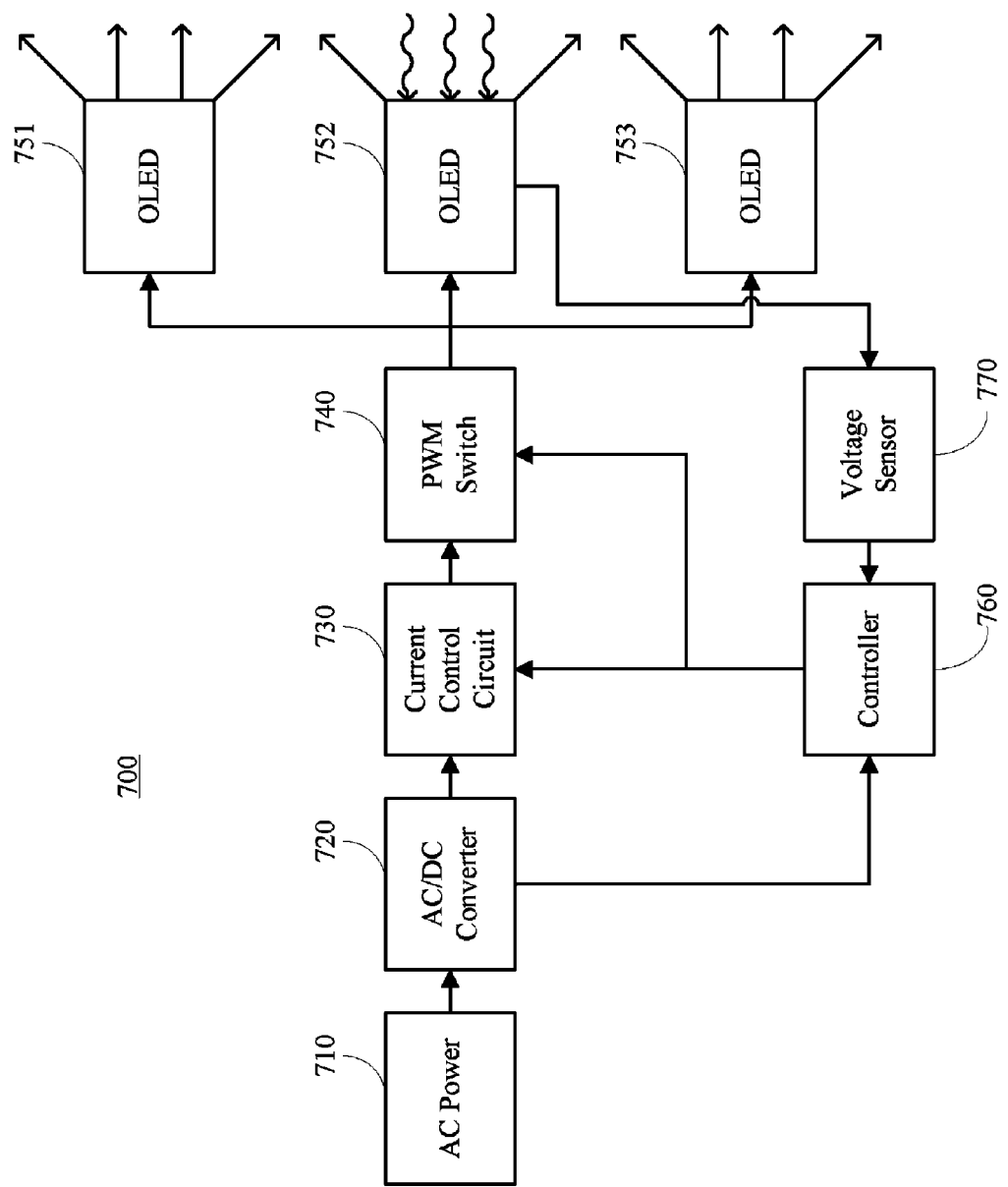
FIG. 7 provides a block diagram of a lighting system according to an exemplary embodiment of the disclosure.

Referring to FIG. 7, an alternative exemplary embodiment of the present disclosed lighting system 700 is illustrated. System 700 includes an AC power supply 710, an AC/DC converter 720, current control circuit 730, PWM switch 740 and controller 760.

System 700 also includes a plurality of OLEDs 751, 752 and 753. OLEDs 751, 752 and 753 can be planar or flexible OLEDs. When flexible OLEDs are used, light may be detected from all directions surrounding the OLED. System 700 may include a plurality of OLEDs, where only one OLED 752 functions as an ambient light detector. OLED 752 can be coupled with voltage sensor 770. Alternatively, more than one, but not all of the OLEDs 751, 752 and 753 may function as an ambient light detector where each OLED that functions as a detector is coupled to voltage sensor 770.

OLED 752 can detect ambient light in a deactivated state. OLEDs 751, 752 and 753 may be positioned in a single space or in various spaces. Induced voltage detection can be performed at various time intervals and depend on various factors such as time of day, season of the year, type of activity conducted in the environment, etc. Alternatively, induced voltage detection can be performed according to a user input or a third party input, such as a utility company.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An organic light emitting system, comprising:
   an organic light emitting device (OLED) having an anode, a cathode, and an organic light emitting layer disposed between the anode and cathode, the OLED configured to provide an output voltage signal associated with ambient light impinging on a surface of the OLED; and
   a control system coupled to the OLED, the control system configured to receive the output voltage signal from the OLED and to control emission of light from the OLED based on the output voltage signal received from the OLED.

2. An organic light emitting system as in claim 1, wherein the OLED is operable in a first mode to detect light and operable in a second mode to emit light, the OLED being configured to provide the output voltage signal associated with ambient light impinging on the surface of the OLED when operated in the first mode.

3. An organic light emitting system as in claim 1, wherein the control system is configured to control the emission of light from the OLED by increasing a luminescence level in the OLED, decreasing a luminescence level in the OLED, turning the OLED off or turning the OLED on to a predetermined luminescence.

4. An organic light emitting system, as in claim 1, wherein the OLED is a flexible OLED.

5. An organic light emitting system as in claim 1, wherein the organic light emitting system includes a plurality of OLEDs.

6. An organic light emitting system as in claim 5, wherein the control system receives an output voltage signal from only one of the plurality of OLEDs.

7. An organic light emitting system as in claim 5, wherein the control system receives an output voltage signal from a plurality of OLEDs.

8. An organic light emitting system as in claim 7, wherein the output voltage signal is an average of output voltage signals from the plurality of OLEDs.

9. A method of controlling emission of an organic light emitting device (OLED), the OLED comprising an anode, a cathode, and an organic light emitting layer disposed between the anode and cathode, the method comprising:
    operating the OLED in a first mode such that the OLED is configured to provide a voltage output signal indicative of ambient light impinging on a surface of the OLED;
    receiving the voltage output signal at a controller;
    operating the OLED in a second mode such that the OLED is configured to emit light; and
    adjusting the emission of light by the OLED based on the voltage output signal.

10. A method as in claim 9, the method further comprising comparing the voltage output signal to a first predetermined value.

11. A method as in claim 10, the method further comprising:
    increasing an emission luminescence level of the OLED when the voltage output signal is less than the first predetermined value.

12. A method as in claim 10, the method further comprising:
    decreasing an emission luminescence level of the OLED when the voltage output signal is greater than the first predetermined value.

13. A method as in claim 10, the method further comprising:
    comparing the voltage output signal induced on the OLED to a second predetermined value when the voltage output signal is less than the first predetermined value; and
    deactivating emission of the OLED when the voltage output signal is less than the second predetermined value.

14. A method as in claim 10, the method further comprising:
    comparing the voltage output signal induced on the OLED to a second predetermined value when the voltage output signal is greater than the first predetermined value; and
    activating emission of the OLED from an off state when the voltage output signal is greater than the second predetermined value.

15. A method as in claim 9, wherein the method further comprises:
    receiving a voltage output signal indicative of ambient light impinging on a surface of one of a plurality of OLEDs; and
    adjusting the emission of light of the plurality of OLEDs based on the voltage output signal indicative of ambient light impinging on the surface of one of the plurality of OLEDs.

16. A method as in claim 9, wherein the method further comprises:
    receiving a voltage output signal indicative of ambient light impinging on a surface of a plurality of OLEDs; and
    adjusting the emission of light of the plurality of OLEDs based on the voltage output signal indicative of ambient light impinging on the surface of the plurality of OLEDs.

17. A method as in claim 16, adjusting the emission of light by the OLED based on the voltage output signal comprises:
    receiving a plurality of voltage output signals indicative of ambient light impinging on a surface of the plurality of OLEDs;
    averaging the plurality of voltage output signals indicative of ambient light impinging on the surface of the plurality of OLEDs to determine an average voltage output; and
    controlling emission of light by the plurality of OLEDs based on an average voltage output.

* * * * *